United States Patent [19]
Henry et al.

[11] Patent Number: 5,619,667
[45] Date of Patent: Apr. 8, 1997

[54] METHOD AND APPARATUS FOR FAST FILL OF TRANSLATOR INSTRUCTION QUEUE

[75] Inventors: Glenn Henry; Terry Parks, both of Austin, Tex.

[73] Assignee: Integrated Device Technology, Inc., Santa Clara, Calif.

[21] Appl. No.: 626,249

[22] Filed: Mar. 29, 1996

[51] Int. Cl.$^6$ .................. G06F 9/30; G06F 9/38
[52] U.S. Cl. ............ 395/384; 395/250; 395/465; 395/800
[58] Field of Search ................ 395/375, 750, 395/465, 800

[56] References Cited

U.S. PATENT DOCUMENTS

| | | | |
|---|---|---|---|
| 4,415,969 | 11/1983 | Bayliss et al. | 395/375 |
| 5,070,475 | 12/1991 | Normoyle et al. | 395/375 |
| 5,235,686 | 8/1993 | Bosshart | 395/375 |
| 5,317,701 | 5/1994 | Reininger et al. | 395/375 |
| 5,497,496 | 3/1996 | Ando | 395/800 |
| 5,509,130 | 4/1996 | Trauben et al. | 395/375 |

*Primary Examiner*—Robert B. Harrell
*Assistant Examiner*—Saleh Najjar
*Attorney, Agent, or Firm*—James W. Huffman

[57] ABSTRACT

A fast fill method and apparatus for an instruction queue within a pipeline processor is provided. An instruction queue is placed between a translator and an instruction register within a pipeline processor to reduce holes or bubbles in the pipeline resulting from either the fetch stage or the translate/decode stage. The instruction queue is fast filled by the translator by providing multiple micro instructions from the translator, in parallel to either or both of the instruction queue and the instruction register. Queue store control logic is provided to manage sequencing of micro instructions between the translator, the instruction queue, and the instruction register.

29 Claims, 4 Drawing Sheets

| Instruction number | Clock Number | | | | | | | | | |
|---|---|---|---|---|---|---|---|---|---|---|
| | 1 | 2 | 3 | 4 | 5 | 6 | 7 | 8 | 9 | 10 |
| Instruction i | I | X | R | A | D | W | | | | |
| Instruction i + 1 | | I | X | R | A | D | W | | | |
| Instruction i + 2 | | | I | X | R | A | D | W | | |
| Instruction i + 3 | | | | I | X | R | A | D | W | |
| Instruction i + 4 | | | | | I | X | R | A | D | W |

| Instruction number | Clock Number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Instruction *i* | I | X | R | A | D | W | | | | | | |
| Instruction *i* + 1 | | I | X | R | A | D | W | | | | | |
| Instruction *i* + 2 | | | I | X | R | A | D | W | | | | |
| Instruction *i* + 3 | | | | I | hole | X | R | A | D | W | | |
| Instruction *i* + 4 | | | | | hole | I | X | R | A | D | W | |
| Instruction *i* + 5 | | | | | | hole | I | X | R | A | D | W |

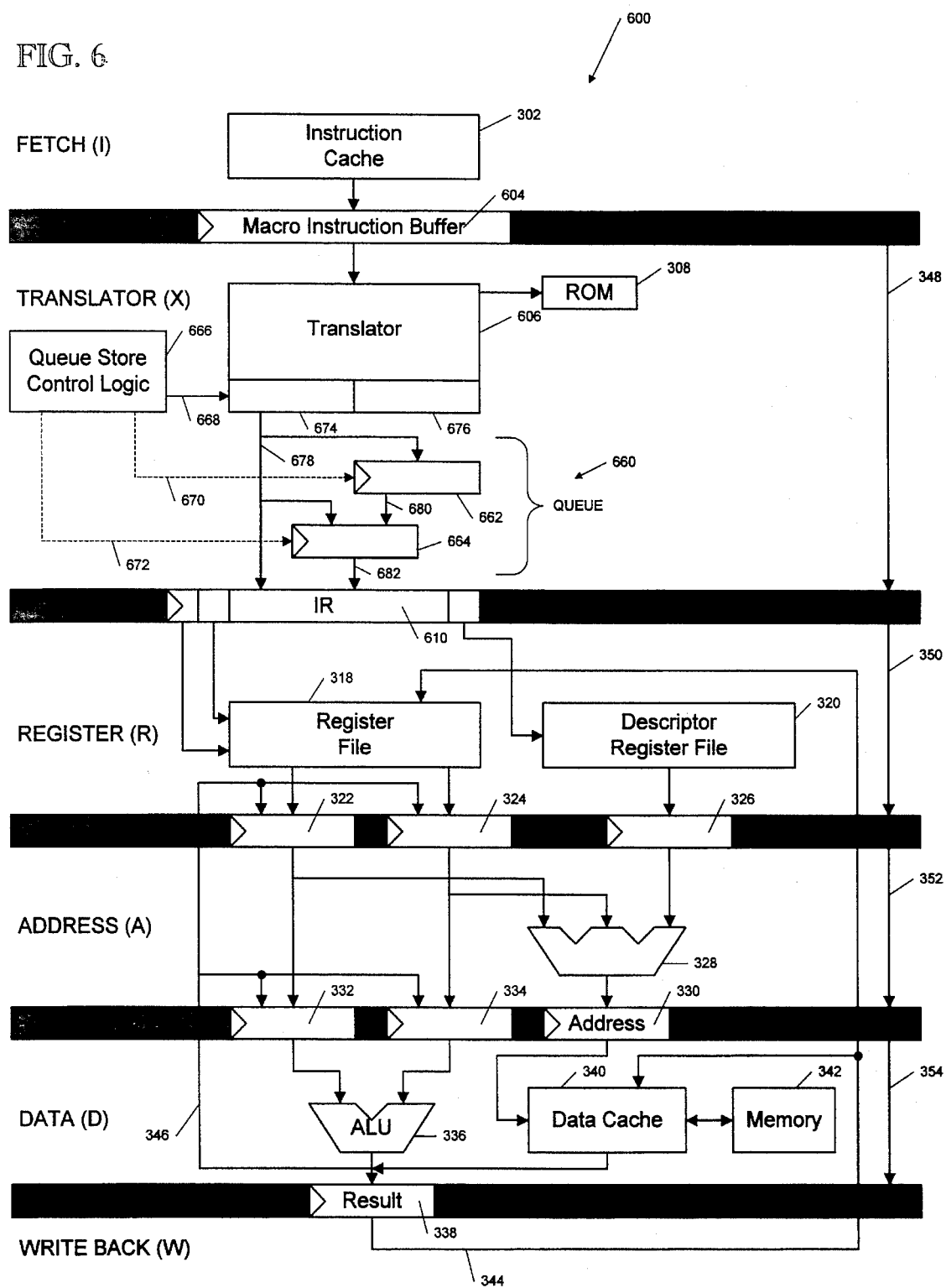

METHOD AND APPARATUS FOR FAST FILL OF TRANSLATOR INSTRUCTION QUEUE

BACKGROUND

1. Field of the Invention

This invention relates in general to the field of instruction execution in a pipeline processing system, and more particularly to a method and apparatus which fast fills an instruction queue.

2. Description of the Related Art

Modern computer systems utilize a number of different processor architectures to perform program execution. In conventional microprocessor based systems, a computer program is made up of a number of macro instructions that are provided to the microprocessor for execution. The microprocessor decodes each macro instruction into a sequence of micro instructions, i.e., simple machine instructions that the hardware in the microprocessor can understand, and executes all of the micro instructions in the sequence before decoding another macro instruction.

In more advanced computer systems, another type of microprocessor, called a "pipeline" processor, is used. A pipeline processor decodes macro instructions, similar to those of a conventional microprocessor, into a sequence of micro instructions. However, the sequence of micro instructions are overlapped during execution to improve performance. Such overlapping of micro instructions during execution is known as "pipelining". Pipelining is a key implementation technique used to make fast microprocessors.

A pipeline is like an assembly line. Each step in a pipeline operates in parallel with other steps, though on a different micro instruction. Like the assembly line, different steps are completing different parts of a macro instruction in parallel. Each of these steps is called a pipe stage or a pipe segment. The stages are connected one to the next to form a pipe-instructions enter at one end, progress through the stages, and exit at the other end. For a more detailed discussion of pipelining, see *Computer Architecture: A Quantitative Approach*, by John L. Hennessy and David A. Patterson, 2<sup>nd</sup> ed.

The beginning stage of a pipeline processor is known as the "fetch" stage. In this stage, macro instructions are fetched from memory and placed into a buffer which feeds the next stage in the pipeline, typically the "translate/decode" stage. The translate/decode stage translates the macro instructions, one at a time, into a sequence of micro instructions, which are provided, one at a time, to an instruction register. The instruction register is a register which provides temporary storage for micro instructions. The instruction register provides the micro instructions, one at a time, to later stages in the pipeline, for execution.

Flow of instructions through a pipeline is typically controlled by a system clock, or processor clock signal. For example, during a first clock cycle, a first macro instruction may be fetched-from memory. By the end of the clock cycle, the first macro instruction is placed into the buffer which feeds the translate/decode stage. During a second clock cycle, a second macro instruction may be fetched and placed into the buffer. In addition, and in parallel to the second macro instruction fetch, the first macro instruction is "read" by the translate/decode logic, and translated into a sequence of micro instructions. By the end of the second clock cycle, the first micro instruction in the sequence is provided to the instruction register. During a third clock cycle, the first micro instruction is provided to later stages in the pipeline, and a second micro instruction is stored in the instruction register. This pipeline process continues indefinitely.

As long as the fetch stage of the pipeline continues to fetch macro instructions during each clock cycle, and as long as the translate/decode stage is able to translate the macro instructions into micro instructions, and provide a micro instruction to the instruction register during each clock cycle, then the pipeline of the processor stays full, at least with respect to the fetch, and translate/decode stages. However, in many instances, the fetch stage, or the translate/decode stage is not able to perform their tasks within the allotted time, i.e., within a single clock cycle. For example, the fetch stage may be required to fetch a macro instruction from a memory location which is not readily accessible. For reasons known to one skilled in the art, the macro instruction may not exist in the instruction cache (e.g., fast memory which temporarily stores instructions for the processor), but rather, the macro instruction may be located in system memory, or possibly even on permanent memory such as a hard disk. Thus, the fetch stage of the pipeline may require many clock cycles to retrieve the needed macro instruction. In a similar fashion, the translate/decode logic may not be able to completely decode a macro instruction and provide a micro instruction to the instruction register within a single clock cycle.

When stages in a pipeline are not able to complete their tasks within a single processor cycle, "holes" in the pipeline are created. As in an assembly line, when one of the stages in the line halts, it backs up all earlier stages in the line. However, later stages in the line continue to completion. In a pipeline processor, if the translate/decode stage cannot provide a micro instruction to the instruction register during a single clock cycle, but can provide the micro instruction to the instruction register during a second clock cycle, then a hole of one clock cycle now exists, between the instruction register, and later stages in the pipeline. When holes are created in a pipeline, performance of the processor is effected accordingly.

To overcome the performance problem associated with holes in a pipeline, a number of improvements have been made. One such improvement, alluded to above, is to place a high speed instruction cache close to the fetch stage of the processor. By utilizing sophisticated caching schemes, and by providing sufficient memory for the instruction cache, chances of needing an instruction that is not in the cache are reduced.

Another improvement for reducing holes in pipeline processors is to include an instruction queue within the translate/decode stage of a pipeline processor. The instruction queue is positioned in between the translate/decode logic and the instruction register, and is used to temporarily store more than one micro instruction at a time. Typical instruction queues may hold four, or even eight micro instructions. If we assume, for example, that an instruction queue contains micro instructions, and that during a particular clock cycle, the translate/decode logic is not able to provide a micro instruction to the instruction register, then the next micro instruction can be provided by the instruction queue. Then, during the next clock cycle, the translate/decode logic can provide the micro instruction to either the instruction register, or to the instruction queue, as needed. Thus, by using an instruction queue in between the translate/decode logic and the instruction register, a hole in the pipeline is prevented.

What has not yet been discussed, however, is what happens when the instruction queue is empty. As discussed above, the fetch stage is typically able to provide a macro instruction to the translate/decode stage within a single processor cycle. And, the translate/decode stage is able to decode the macro instruction and provide a micro instruction to the instruction register during a single processor cycle. As this process continues, there is no opportunity for an instruction queue to get ahead, so to speak, to be of any value to the pipeline. This is because later stages in the pipeline are continuing to demand the most recent micro instruction from the instruction register. And, the instruction register is continuing to demand the most recent micro instruction out of the translator. Unless the instruction queue can some how jump ahead of the instruction register, by at least one clock cycle, its contents are of no use.

To get ahead of the instruction register, and the later stages in the pipeline, the only way heretofore used to fill an instruction queue is to wait for a "stall" to occur in later stages of the pipeline. For example, one of the later stages in a pipeline is the data stage. During the data stage, either an ALU operation is executed, or data is retrieved from memory. If a memory retrieval operation occurs, and this operation requires more than one clock cycle to execute, then all earlier stages in the pipeline are stalled, or halted. When the data stage creates a stall in the pipeline, the instruction queue takes advantage of the stall by filling one of its instruction buffers with a micro instruction from the translate/decode logic. If the data stage requires two clock cycles for execution, the instruction queue can get ahead of the pipeline by one instruction. If the data stage requires three clock cycles for execution, the instruction queue can get ahead of the pipeline by two instructions, etc. When the stall condition ceases, micro instructions may be provided by the instruction queue, and the translate/decode logic can continue to fill the queue. If a hole occurs in the fetch stage or the translate/decode stage, the hole is then filled by the instruction queue, as discussed above.

A problem with the above technique is that it is dependent on stalls in the pipeline to allow opportunity for the instruction queue to be filled. Thus, in instances where the instruction queue is empty, either at the start of a program, or on program branches, the queue is useless at filling holes until stalls occur in later stages of the pipeline. The instruction queue must be filled to be of any benefit in preventing holes in a pipeline. What is needed is a method for filling the instruction queue without having to wait for stalls in later pipeline stages.

SUMMARY

For the foregoing reasons, there is a need for an apparatus and method for fast filling an instruction queue without requiring stalls in a pipeline.

To address the above-detailed deficiencies, it is an object of the present invention to provide an apparatus and method which fast fills an instruction queue by generating two micro instructions in parallel, and which provides these instructions to either or both of an instruction queue and an instruction register.

Accordingly, in the attainment of the aforementioned object, it is a feature of the present invention to provide a pipeline processor system, for executing macro instructions where the system includes: an instruction cache, for storing the macro instructions; and a translator, connected to the instruction cache, for retrieving the macro instructions from the instruction cache, and for translating the macro instructions into a plurality of micro instructions. The translator includes: a macro instruction buffer, for temporarily storing macro instructions retrieved from the instruction cache; translate/decode logic connected to the macro instruction buffer, for translating the macro instructions in the macro instruction buffer into the plurality of micro instructions; and a plurality of output buffers for temporarily storing the plurality of micro instructions. The pipeline processor system also includes an instruction register, connected to the translator, for storing the plurality of micro instructions, for execution later stages in the pipeline processor system; and an instruction queue, connected between the translator and the instruction register, also for receiving the plurality of micro instructions from the translator, for temporarily storing the plurality of micro instructions, and for providing the plurality of micro instructions to the instruction register. The instruction queue includes: a plurality of queue buffers, connected to the output buffers, for receiving the plurality of micro instructions from the output buffers, and for temporarily storing the plurality of micro instructions; and queue store control logic, connected to the translator, and to the plurality of queue buffers, for storing select ones of the plurality of micro instructions into select ones of the plurality of queue buffers, and for later providing the select ones of the plurality of micro instructions to the instruction register. By providing at least two of the plurality of micro instructions, in parallel, to the instruction queue and to the instruction register, no stalls in the pipeline processor are required to allow the instruction queue to be filled.

Another feature of the present invention is to provide the pipeline processor system, as mentioned above, where the plurality of output buffers provides a micro instruction transmission interface between the translate/decode logic, and both the instruction register and the instruction queue.

An additional feature of the present invention is to provide the pipeline processor system, as mentioned above, where the instruction queue can store more than one of the plurality of micro instructions within a single clock cycle of the processor system.

Yet another feature of the present invention is to provide the pipeline processor system, as mentioned above, where the instruction queue provides the plurality of micro instructions one at a time to the instruction register.

A further feature of the present invention is to provide the pipeline processor system, as mentioned above, where the queue control logic controls the transfer of the plurality of micro instructions from the translator to the instruction register and to the plurality of queue buffers.

An additional feature of the present invention is to provide the pipeline processor system, as mentioned above, where the plurality of micro instructions include: a first micro instruction associated with a first macro instruction; and a second micro instruction, associated with the first macro instruction. In addition, the first micro instruction and the second micro instruction are provided by the translate/decode logic to the plurality of output buffers in parallel. Furthermore, the first micro instruction is transferred from the plurality of output buffers to the instruction register, and the second micro instruction is transferred to the instruction queue, in parallel.

Yet another feature of the present invention is to provide the pipeline processor system, as mentioned above, where the instruction queue does not contain any micro instructions prior to the transfer of the second micro instruction; and where the parallel transfer of the second micro instruction to the instruction queue, with that of the first instruction to the instruction register, allows the instruction queue to fill its plurality of queue buffers without waiting for a stall to occur in a later pipeline stage within the pipeline processor system.

In another aspect of the present invention, it is a feature to provide a pipeline processor, having multiple processing stages, for translating macro instructions into a plurality of micro instructions, and for executing the plurality of micro instructions. The pipeline processor includes: a macro instruction buffer, connected to a memory thereof, for receiving macro instructions therefrom, and for storing the macro instructions; a translator, connected to the macro instruction buffer, for decoding each of the macro instructions, and for generating a plurality of micro instructions for each of the macro instructions, wherein the translator can generate two of the plurality of micro instructions in parallel; an instruction register, connected to the translator, for storing the plurality of micro instructions, and for providing the plurality of micro instructions to the processing stages within said pipeline processor; and an instruction queue, connected between the translator and the instruction register, for temporarily storing selected ones of the plurality of micro instructions, and for providing the selected ones of the plurality of micro instructions to the instruction register. The instruction queue includes: a plurality of queue buffers, connected to the translator, for receiving the selected ones of the plurality of micro instructions, for temporarily storing the selected ones of the plurality of micro instructions, and for providing the selected ones of the plurality of micro instructions to the instruction register, as needed; and queue store control logic, connected to the translator, and to the plurality of queue buffers, for selecting which of the plurality of micro instructions should be stored in the plurality of queue buffers, which of the plurality of micro instructions should be provided from the translator to the instruction register, and which of the selected ones of the plurality of micro instructions should be transferred from the plurality of queue buffers to the instruction register. The translator generates the two micro instructions in parallel, and the queue store control logic transfers a first of the two micro instructions to the instruction register, and a second of the two micro instructions to one of the plurality of queue buffers.

Another feature of the present invention is to provide the pipeline processor, as mentioned above, where the translator generates the plurality of micro instructions as required for each of the macro instructions, in a specified order, and wherein a first micro instruction, and a second micro instruction, within the plurality of micro instructions, are generated in parallel.

Yet another feature of the present invention is to provide the pipeline processor, as mentioned above, where the first micro instruction is provided by the translator to the instruction register, and the second micro instruction is provided by the translator to the instruction queue.

In a further aspect of the present invention, it is a feature to provide a method for fast filling an instruction queue within a pipeline processor having a translator and an instruction register, where the instruction queue is between the translator and the instruction register. The method includes: loading a macro instruction into the translator; translating the macro instruction into a plurality of micro instructions; providing at least two of the plurality of micro instructions in parallel; storing a first of the at least two of the plurality of micro instructions to the instruction register; and storing a second of the at least two of the plurality of micro instructions to the instruction queue; where, by providing at least two of the plurality of micro instructions; and by storing a first of the at least two of the plurality of microinstructions to the instruction register and a second of the at least two of the plurality of micro instructions to the instruction queue, the instruction queue is filled with a micro instruction without requiring a stall in the pipeline processor.

In yet another aspect of the present invention, it is a feature to provide a method for fast filling an instruction queue within a pipeline processor having a translator and an instruction register, and where the instruction queue is between the translator and the instruction register. The method includes: loading a macro instruction into the translator; translating the macro instruction into a plurality of micro instructions; providing at least two of the plurality of micro instructions in parallel; storing a first of the at least two of the plurality of micro instructions to a first location within the instruction queue; and storing a second of the at least two of the plurality of micro instructions to a second location within the instruction queue; wherein the storing of the first of at least two of the plurality of micro instructions, and the storing of the second of at least two of the plurality of micro instructions occur during a first clock cycle within the pipeline processor.

Another feature of the present invention is to provide the method, as mentioned above, where during a second clock cycle, the method transfers the first of the at least two of the plurality of micro instructions from the first location within the instruction queue to the instruction register; and transfers the second of the at lest two of the plurality of micro instructions from the second location within the instruction queue to the first location within the instruction queue.

An advantage of the present invention is that no pipeline stalls are required to allow an instruction queue to be filled. By filling the instruction queue without stalls, there will be less chance that bubbles, or holes, in the pipeline will exist. And, the less holes in a pipeline, the better the performance.

Additional objects, features and advantages of the invention will be described hereinafter. Those skilled in the art should appreciate that they can readily use the disclosed conception and specific embodiment as a basis for designing or modifying other structures for carrying out the same purposes of the present invention.

DESCRIPTION OF THE DRAWINGS

These and other objects, features, and advantages of the present invention will become better understood with regard to the following description, and accompanying drawings where:

FIG. 6 is a block diagram of a pipeline processor which incorporates features according to the present invention.

DETAILED DESCRIPTION

Figures 1, 2:
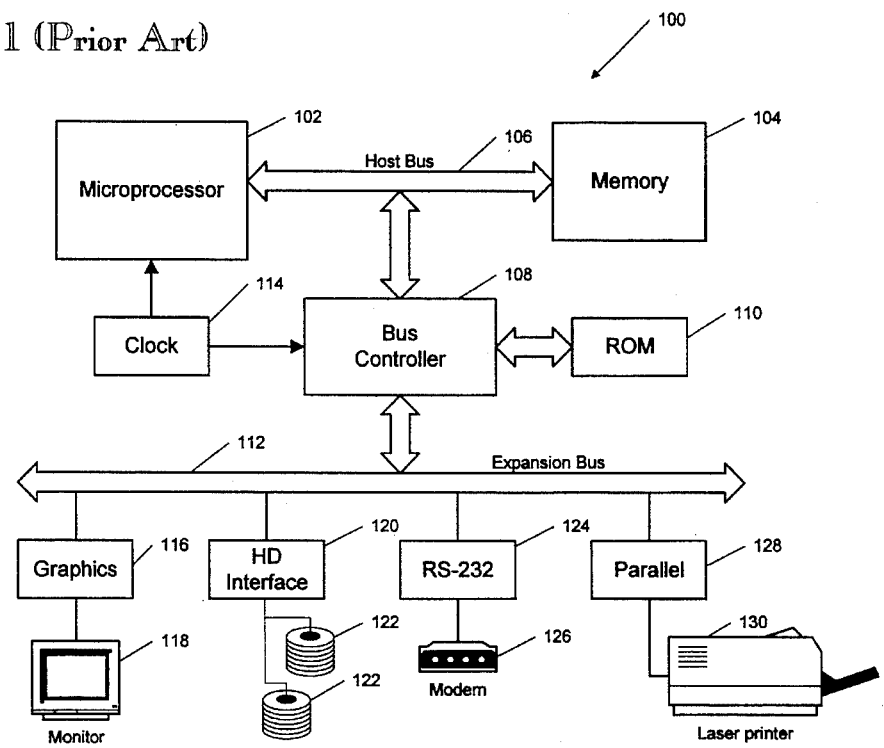
FIG. 1 is a block diagram of a computer system which can incorporate a processing system according to the present invention.
FIG. 2 is a pipeline flow table illustrating progression of micro instructions through various pipeline stages.

Referring to FIG. 1, a block diagram of a typical computer system 100 is shown. The computer system 100 includes a microprocessor 102 connected to a memory 104 via a host bus 106. Also connected to the microprocessor 102 and the memory 104 via the host bus 106 is a bus controller 108. The bus controller 108 provides an interface between the host bus 106 and a ROM 110, and an expansion bus 112. A system clock 114 is provided to both the microprocessor 102 and the bus controller 108. Connected to the expansion bus 112 is a monitor 118 via a graphics controller 116, hard disk drives 122 via a disk interface 120, a modem 126 via an RS-232 interface 124, and a printer 130 via a parallel port 128.

In operation, the microprocessor 102 executes macro instructions retrieved from either the memory 104, the ROM 110 or the hard disks 122. The microprocessor can retrieve data from or store data to the memory 104 or the hard disks 122. In addition, the microprocessor can send data to either the modem 126 or the printer 130. A user interface to the microprocessor is provided by the monitor 118. The computer system 100 is typical of the type of computing system environment into which a pipeline processor according to the present invention may be used.

Now referring to FIG. 2, a pipeline flow table 200 is provided. The flow table illustrates the execution of various micro instructions through various stages of a pipeline microprocessor. Down the left side of the table 200 are micro instructions labeled i through i+4. Across the top of the table 200 are clock cycles 1 through 10. Under the clock cycles, and to the right of the micro instructions, are pipeline stage labels I, X, R, A, D and W. These pipeline stages correspond to the stages in the pipeline processor of FIG. 3, discussed below. Briefly, the pipeline stages are I (Fetch instruction); X (Translate/decode instruction); R (Register access); A (Address calculation); D (Data manipulation or retrieval); and W (Write Back).

During clock cycle 1, the instruction i enters the I stage. During clock cycle 2, the instruction i enters the X stage, and instruction i+1 enters the I stage. During clock cycle 3, instruction i enters the R stage, instruction i+1 enters the X stage, and instruction i+2 enters the I stage. During clock cycle 4, instruction i enters the A stage, instruction i+1 enters the R stage, instruction i+2 enters the X stage, and instruction i+3 enters the I stage. This process continues until instruction i+4 leaves the W stage at clock cycle 10. What is illustrated in FIG. 2 is a pipeline processor which executes five micro instructions, i through i+4, through a six stage pipeline processor, without creating any stall conditions, and without any holes in the pipeline. What will be shown with reference to FIG. 4 is a pipeline sequence that includes a stall condition in one of the pipeline stages. However, a discussion of a pipeline processor for executing such instructions is first provided with reference to FIG. 3.

Figure 3:
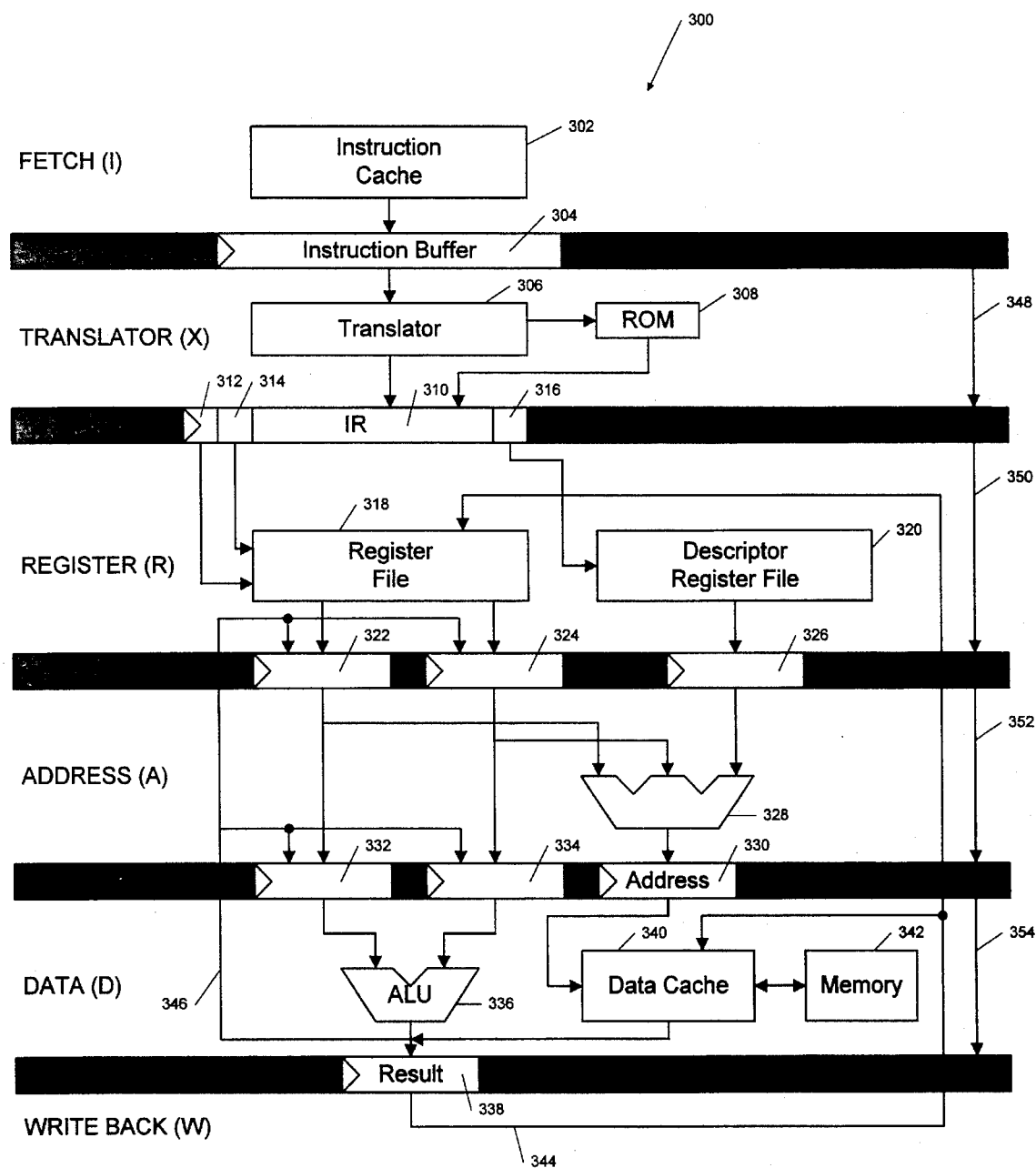
FIG. 3 is a block diagram for a pipeline processor.
Figures 4, 5:
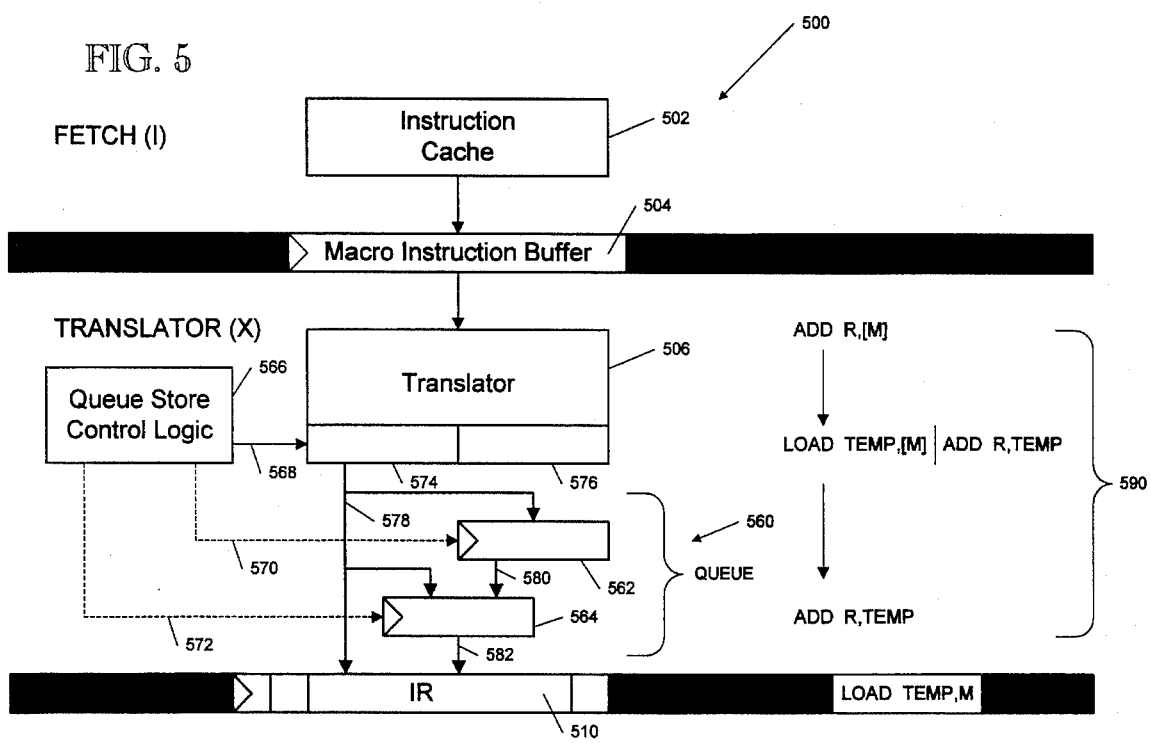
FIG. 4 is a pipeline flow table similar to that of FIG. 2, but illustrates a "hole" in one of the pipeline stages.
FIG. 5 is a portion of a pipeline processor which incorporates features according to the present invention.

Now referring to FIG. 3, a pipeline processor 300 is shown. The processor 300 has a six stage pipeline, with the stages corresponding to those discussed with reference to FIG. 2. During the fetch stage, the processor 300 sends out a value in the program counter (not shown) to fetch the next macro instruction from an instruction cache 302 and places the macro instruction into an instruction buffer 304. The instruction buffer 304 holds the macro instruction that will be needed in subsequent clock cycles. Other buffers, registers, etc. may be placed between the fetch stage and the translate/decode stage, or between other stages in the processor 300, as required. However, for ease of illustration, only specific buffer and registers have been called out.

The translate/decode stage reads the macro instruction located in the instruction buffer 304 into the translator 306. The translator 306 decodes the macro instruction into a sequence of micro instructions, and provides the micro instructions, one at a time, to an instruction register 310. Depending on the complexity of the macro instruction, and the goals of the designer, the micro instruction sequence may be provided either directly by the translator 306, by the ROM 308, or by a combination of both.

As shown, the instruction register 310 contains a number of sections 312, 314 and 316 which may be used to store information relating to the operands upon which the micro instructions will operate. These sections are provided to a register file 318 and to a descriptor register file 320 during the register stage of the pipeline. The contents of sections 312, 314 access specific registers in the register file 318 and select the contents of those registers to be output into two temporary registers 322, 324 for use in later clock cycles. Likewise, the contents of section 316 is used to access a particular descriptor register in the descriptor register file 320 which is output into a third temporary register 326. Temporary register 326 is used in later cycles to calculate an address for an operand.

When a micro instruction requires access to a memory location, either for Load or Store operations, the address stage calculates the effective address. The address is calculated by providing the contents of registers 322, 324, and 326 as inputs to an ALU circuit 328. The ALU circuit 328 selects appropriate inputs, and stores the effective address in an address register 330. For micro instructions which do not require calculation of an effective address, the contents of registers 322, 324 are forwarded directly to temporary registers 332, 334 for use in later stages.

During the data stage, one of two operations occur. The first operation provides the contents of the registers 332, 334 as inputs to an ALU 336 for operation thereon. The result of the operation is placed in a result register 338. A second operation occurs when the micro instruction is not an ALU operation, but rather a Load or Store operation from memory. In this instance, the address in register 330 is provided as input to a data cache 340 to load data therefrom. If the operation is a Load, the data in the data cache 340 is placed in the result register 338. If the data does not reside in the data cache 340, the cache 340 accesses a memory 342, retrieves the requested data, and places the data in the result register 338.

During the write back stage, the contents of the result register 338 are written into either the data cache 340 (if a memory operation, or the register file 318 (if a register operation), via signal line 344. Prior to the write back stage, however, the output of the ALU 336 or the data cache 340 are provided on a forward/bypass bus as possible inputs to temporary registers 322, 324, 332, or 334, for use in later processor cycles. Use of the forward/bypass bus allows use of the value in the result register 338 as an input to either the ALU circuit 328, or the ALU 336 on the next processor cycle.

In addition to the buffers and registers called out in FIG. 3, other information relating to micro instructions may be passed from stage to stage along buses 348, 350, 352 and 354. Thus, FIG. 3 shows how an instruction flows through the data path of pipeline processor 300. At the end of each clock cycle, every value computed during that clock cycle and required on a later clock cycle is written into a storage device, which may be a memory 342, a register file 318, or a temporary register.

Now referring to FIG. 4, a pipeline flow table 400 is provided. The flow table illustrates the execution of various micro instructions through various stages of a pipeline microprocessor, as in FIG. 2. Down the left side of the table 400 are micro instructions labeled i through i+5. Across the top of the table 400 are clock cycles 1 through 12. Under the clock cycles, and to the right of the micro instructions, are pipeline stage labels I, X, R, A, D and W. These pipeline stages correspond to the stages in the pipeline processor of FIG. 3, discussed above.

As in FIG. 2, during clock cycle 1, the instruction i enters the I stage. It should be understood that in practice, the i instruction which is fetched from an instruction cache is a macro instruction. The macro instruction is provided to a translator stage that decodes the macro instruction into a sequence of micro instructions which are provided to later stages of the pipeline. During clock cycle 2, the instruction i enters the X stage, and instruction i+1 enters the I stage. During clock cycle 3, instruction i enters the R stage, instruction i+1 enters the X stage, and instruction i+2 enters the I stage. During clock cycle 4, instruction i enters the A stage, instruction i+1 enters the R stage, instruction i+2 enters the X stage, and instruction i+3 enters the I stage.

At this point, micro instruction execution differs from that of FIG. 2. During clock cycle 5, the instruction i+3 has not been retrieved by the I stage of the processor. For reasons known to those skilled in the art, instruction i+3 requires two clock cycles to retrieve data. Instructions i through i+2 continue down the pipeline as before. But, instruction i+4 cannot yet be retrieved. This instruction must wait until clock cycle 6 to enter the I stage of the pipeline. Likewise, instruction i+5 is slipped one clock cycle and does not enter the I stage until clock cycle 7. Thus, when instruction i+3 causes the I stage to require two clock cycles for execution, all earlier stages in the pipeline are delayed by one clock cycle.

Now referring to FIG. 5, a portion of a pipeline processor 500 is shown. The processor 500 contains an instruction cache 502 for storing macro instructions to be executed by the pipeline processor 500. The instruction cache 502 provides the macro instructions to a macro instruction buffer 504 for temporary storage. The macro instruction buffer 504 provides the macro instructions to a translator 506. The translator 506 decodes the macro instructions into a sequence of micro instructions, and provides these micro instructions, one at a time, to the instruction register 510. The instruction register 510 provides these micro instructions to later stages in the pipeline, as discussed above.

In addition to the translator 506, within the translate/decode stage, an instruction queue 560 is provided. The instruction queue 560 contains two temporary registers 562, 564 which may be used to temporarily store micro instructions. The queue registers 562, 564 and the instruction register 510 are connected to the translator via bus 578. The bus 578 provides micro instructions to either the instruction register 510, or to the instruction queue registers 562, 564. Queue register 562 provides an output to queue register 564 via bus 580, and queue register 564 provides an output to the instruction register 510 via bus 582. Additionally, the instruction queue 560 contains queue store control logic 566 which is connected to the translator 506, and both of the queue registers 562, 564.

As discussed in the background, typical instruction queues require a stall to occur in a pipeline to allow the instruction queue to get ahead. However, the present invention overcomes this problem by providing an apparatus and method within the translator 506 and the instruction queue 560 which allow the instruction queue 560 to get ahead of the pipeline, almost immediately. For purposes of illustration, it is assumed that the processor 500 has just branched to an instruction which requires the addition of a value in memory [M] and a value in a register R, and wishes to store this value in the register. A macro instruction for performing this function is of the form: ADD R,[M].

During a first clock cycle, this instruction is fetched from the instruction cache 502 and placed into the macro instruction buffer 504. During a second clock cycle, the macro instruction ADD R,[M] is decoded into two micro instructions: LOAD TEMP, [M]; and ADD R, TEMP. Typically, the first micro instruction, LOAD TEMP,[M] is provided to the instruction register 510 during the second clock cycle, and the second micro instruction ADD R,TEMP is provided to the instruction register 510 during a third clock cycle. However, in an embodiment of the present invention, both of these micro instructions are translated in parallel by the translator 506 and placed into buffers 574 and 576 for transfer to either of the instruction register 510 and/or the instruction queue 560. To follow the progression of the ADD R,[M] instruction through the instruction queue, please refer to text block 590.

In one embodiment, the bus 578 is a 64-bit bus, and the instruction register 510 and queue registers 562, 564 hold 32-bit micro instructions. The first micro instruction LOAD TEMP,[M] is forwarded by the translator to the instruction register 510 during the second clock cycle. See text block 590. Also during the second clock cycle, the micro instruction ADD R, TEMP is forwarded to the queue register 564. During a third clock cycle, the queue register 564 can forward the ADD R,TEMP instruction to the instruction register 510 and the translator can translate/decode the next macro instruction, placing the associated micro instructions into one or both of the queue registers 562, 564. By providing more than one micro instruction from the translator, in parallel, and by providing a queue control logic 566, connected to the translator via control line 668, and to queue registers 662, 664 via control lines 670, 672, respectively, for selecting appropriate micro instructions for forwarding to either the instruction register 510 and/or the instruction queue registers 562, 564, the instruction queue 560 can be filled, and can get ahead of the pipeline, without requiring stalls in later stages.

Now referring to FIG. 6, a pipeline processor 600 which incorporates the instruction queue apparatus and method of the present invention is shown. The processor 600 contains many of the same elements as described with reference to FIG. 3, like elements are referred to with like numerals, but also includes a macro instruction buffer 605 connected to the instruction cache 302, and to a translator 606. The translator 606 includes two micro instruction buffers 674, 676 which transfer micro instructions, in parallel, to either or both of an instruction queue 660 or an instruction register 610. The instruction register includes two queue registers 662 and 664 which are connected to the translator 606 via bus 678, to each other via bus 680, and to a queue store control logic 666 via buses 670 and 672. Queue register 664 is connected to the instruction register 610 via bus 682. The operation of the instruction queue 660 within the processor 600 is similar to that described with reference to FIG. 5.

Although the present invention has been described in considerable detail with reference to certain preferred versions thereof, other versions are possible. For example, the translator which is connected to the instruction queue, may provide more than two micro instructions, in parallel, allowing the instruction queue to fill even faster. In addition, the instruction queue may have many more queue registers than are shown in FIGS. 5 and 6. Furthermore, the queue store control logic may be incorporated into the translator, or into the instruction queue, as needed. The function of the queue store control logic is to sequence the appropriate micro instructions from the translator to the instruction register. The arrangement of the queue registers, and the method of sequencing by the queue store control logic may be varied without departing from the scope of the present invention. Furthermore, the instruction register itself may be expanded to incorporate some of the functionality of the instruction queue. For example, the instruction register may allow two or more micro instructions to be stored directly from the translator, or from the instruction queue. All of these versions are within the scope of the present invention. It should be understood that various changes, substitutions and alterations can be made herein without departing from the spirit and scope of the invention as defined by the appended claims.

We claim:

1. A pipeline processor system, for executing macro instructions, the system comprising:

an instruction cache, for storing said macro instructions;

a translator, connected to said instruction cache, for retrieving said macro instructions from said instruction cache, and for translating said macro instructions into a plurality of micro instructions, said translator comprising:

a macro instruction buffer, for temporarily storing macro instructions retrieved from said instruction cache;

translate/decode logic connected to said macro instruction buffer, for translating said macro instructions in said macro instruction buffer into said plurality of micro instructions; and a plurality of output buffers for temporarily storing said plurality of micro instructions;

an instruction register, connected to said translator, for storing said plurality of micro instructions, for execution in later stages in said pipeline processor system; and an instruction queue, connected between said translator and said instruction register, also for receiving said plurality of micro instructions from said translator, for temporarily storing said plurality of micro instructions, and for providing said plurality of micro instructions to said instruction register, said instruction queue comprising:

a plurality of queue buffers, connected to said output buffers, for receiving said plurality of micro instructions from said output buffers, and for temporarily storing said plurality of micro instructions; and queue store control logic, connected to said translator, and to said plurality of queue buffers, for storing select ones of said plurality of micro instructions into select ones of said plurality of queue buffers, and for later providing said select ones of said plurality of micro instructions to said instruction register;

whereby, said translator provides at least two of said plurality of micro instructions, in parallel, to said instruction queue, and to said instruction register.

2. The processor system as recited in claim 1 wherein said pipeline processor system is a microprocessor.

3. The processor system as recited in claim 2 wherein said instruction cache is a memory within said microprocessor for storing said macro instructions.

4. The processor system as recited in claim 1 wherein said instruction cache is a memory for storing macro instructions.

5. The processor system as recited in claim 4 wherein said memory is dynamic read only memory.

6. The processor system as recited in claim 1 wherein said macro instruction buffer can store a plurality of macro instructions received from said instruction cache.

7. The processor system as recited in claim 1 wherein said translate/decode logic can translate a single one of said macro instructions into said plurality of micro instructions within a single processor system clock cycle.

8. The processor system as recited in claim 1 wherein said plurality of output buffers provides a micro instruction transmission interface between said translate/decode logic, and both of said instruction register and said instruction queue.

9. The processor system as recited in claim 1 wherein said instruction register is a temporary register used to hold micro instructions that will be needed on subsequent clock cycles by said processor system.

10. The processor system as recited in claim 1 wherein said instruction queue can store more than one of said plurality of micro instructions within a single clock cycle of said processor system.

11. The processor system as recited in claim 1 wherein said instruction queue provides said plurality of micro instructions one at a time to said instruction register.

12. The processor system as recited in claim 1 wherein parallel conveys that said at least two of said plurality of micro instructions are provided to said instruction queue and to said instruction register during a single processor system clock cycle.

13. The processor system as recited in claim 1 wherein said queue control logic controls the transfer of said plurality of micro instructions from said translator to said instruction register and to said plurality of queue buffers.

14. The processor system as recited in claim 1 wherein said plurality of micro instructions are to be executed by said pipeline processor system in a specified order.

15. The processor system as recited in claim 1 wherein said plurality of micro instructions comprise:

a first micro instruction associated with a first macro instruction; and a second micro instruction, associated with said first macro instruction.

16. The processor system as recited in claim 15 wherein said first micro instruction and said second micro instruction are provided by said translate/decode logic to said plurality of output buffers in parallel.

17. The processor system as recited in claim 16 wherein said first micro instruction is transferred from said plurality of output buffers to said instruction register, and said second micro instruction is transferred to said instruction queue, in parallel.

18. The processor system as recited in claim 17 wherein said instruction queue does not contain any micro instructions prior to said transfer of said second micro instruction.; and whereby said parallel transfer of said second micro instruction to said instruction queue, with that of said first instruction to said instruction register, allows said instruction queue to fill its plurality of queue buffers without waiting for a stall to occur in a later pipeline stage within said pipeline processor system.

19. The processor system as recited in claim 18 wherein said stall creates a delay in processing for micro instructions.

20. A pipeline processor, having multiple processing stages, for translating macro instructions into a plurality of micro instructions, and for executing the plurality of micro instructions, the pipeline processor comprising:

a macro instruction buffer, connected to a memory thereof, for receiving macro instructions therefrom, and for storing said macro instructions;

a translator, connected to said macro instruction buffer, for decoding each of said macro instructions, and for generating a plurality of micro instructions for each of said macro instructions, wherein said translator can generate two of said plurality of micro instructions in parallel;

an instruction register, connected to said translator, for storing said plurality of micro instructions, and for providing said plurality of micro instructions to said processing stages within said pipeline processor; and an instruction queue, connected between said translator and said instruction register, for temporarily storing selected ones of said plurality of micro instructions, and for providing said selected ones of said plurality of micro instructions to said instruction register, said instruction queue comprising:

a plurality of queue buffers, connected to said translator, for receiving said selected ones of said plurality of micro instructions, for temporarily storing said selected ones of said plurality of micro instructions, and for providing said selected ones of said plurality of micro instructions to said instruction register, as needed; and queue store control logic, connected to said translator, and to said plurality of queue buffers, for selecting which of said plurality of micro instructions should be stored in said plurality of queue buffers, which of said plurality of micro instructions should be provided from said translator to said instruction register, and which of said selected ones of said plurality of micro instructions should be transferred from said plurality of queue buffers to said instruction register;

whereby said translator generates said two micro instructions in parallel, and said queue store control logic transfers a first of said two micro instructions to said instruction register, and a second of said two micro instructions to one of said plurality of queue buffers.

21. The pipeline processor, as recited in claim 20 wherein said macro instruction buffer can store a plurality of said macro instructions.

22. The pipeline processor, as recited in claim 20 wherein said translator generates said plurality of micro instructions as required for each of said macro instructions, in a specified order, and wherein a first micro instruction, and a second micro instruction, within said plurality of micro instructions, are generated in parallel.

23. The pipeline processor, as recited in claim 22 wherein said first micro instruction is provided by said translator to said instruction register, and said second micro instruction is provided by said translator to said instruction queue.

24. The pipeline processor, as recited in claim 20 wherein said plurality of queue buffers further comprise:

a first queue buffer, connected to said translator and to said instruction register, for temporarily storing a first one of said plurality of micro instructions;

a second queue buffer, connected to said translator and to said first queue buffer, for temporarily storing a second one of said plurality of micro instructions.

25. The pipeline processor, as recited in claim 24 wherein said queue store control logic transfers said first one of said plurality of micro instructions from said translator to said first queue buffer, and said second one of said plurality of micro instructions to said second queue buffer, during a first clock cycle of said pipeline processor.

26. The pipeline processor, as recited in claim 25 wherein during a second clock cycle of said pipeline processor, said queue store control logic transfers said first one of said plurality of micro instructions from said first queue buffer to said instruction register, and said second one of said plurality of micro instructions from said second queue buffer to said first queue buffer.

27. A method for fast filling an instruction queue within a pipeline processor having a translator and an instruction register, and wherein the instruction queue is between the translator and the instruction register, the method comprising:

loading a macro instruction into the translator;

translating the macro instruction into a plurality of micro instructions;

providing at least two of said plurality of micro instructions in parallel;

storing a first of said at least two of said plurality of micro instructions to the instruction register; and storing a second of said at least two of said plurality of micro instructions to the instruction queue;

whereby, by providing at least two of said plurality of micro instructions; and by storing a first of said at least two of said plurality of microinstructions to the instruction register and a second of said at least two of said plurality of micro instructions to the instruction queue, the instruction queue is filled with a micro instruction without requiring a stall in the pipeline processor.

28. A method for fast filling an instruction queue within a pipeline processor having a translator and an instruction register, and wherein the instruction queue is between the translator and the instruction register, the method comprising:

loading a macro instruction into the translator;

translating the macro instruction into a plurality of micro instructions;

providing at least two of said plurality of micro instructions in parallel;

storing a first of said at least two of said plurality of micro instructions to a first location within the instruction queue; and storing a second of said at least two of said plurality of micro instructions to a second location within the instruction queue;

wherein said storing of said first of at least two of said plurality of micro instructions, and said storing of said second of at least two of said plurality of micro instructions occur during a first clock cycle within the pipeline processor.

29. The method for fast filling as recited in claim 28 further comprising:

during a second clock cycle, transferring said first of said at least two of said plurality of micro instructions from the first location within the instruction queue to the instruction register; and transferring said second of said at least two of said plurality of micro instructions from the second location within the instruction queue to the first location within the instruction queue.

* * * * *